A. J. VANCE.
REMOVABLE HEATING PLANT FOR INCUBATORS, &c.
APPLICATION FILED APR. 2, 1917.
1,245,829.
Patented Nov. 6, 1917.
2 SHEETS—SHEET 1.
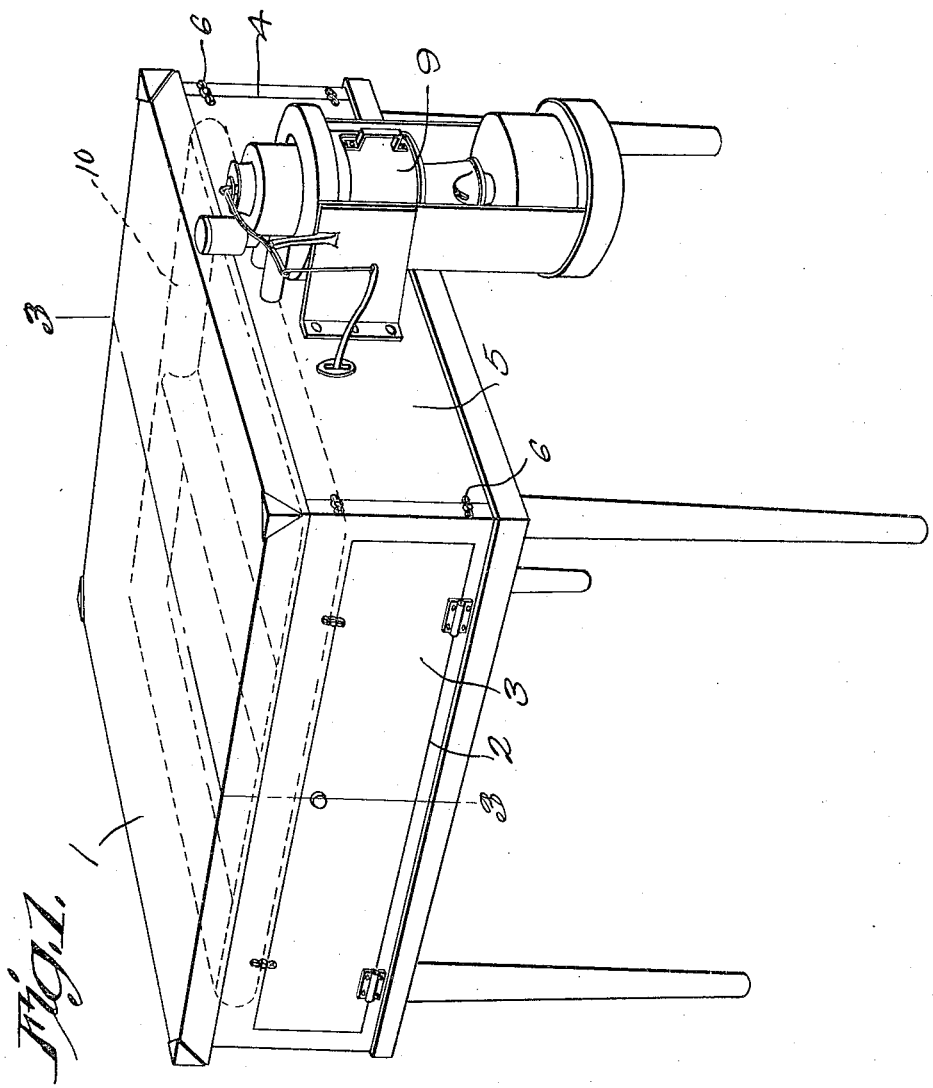

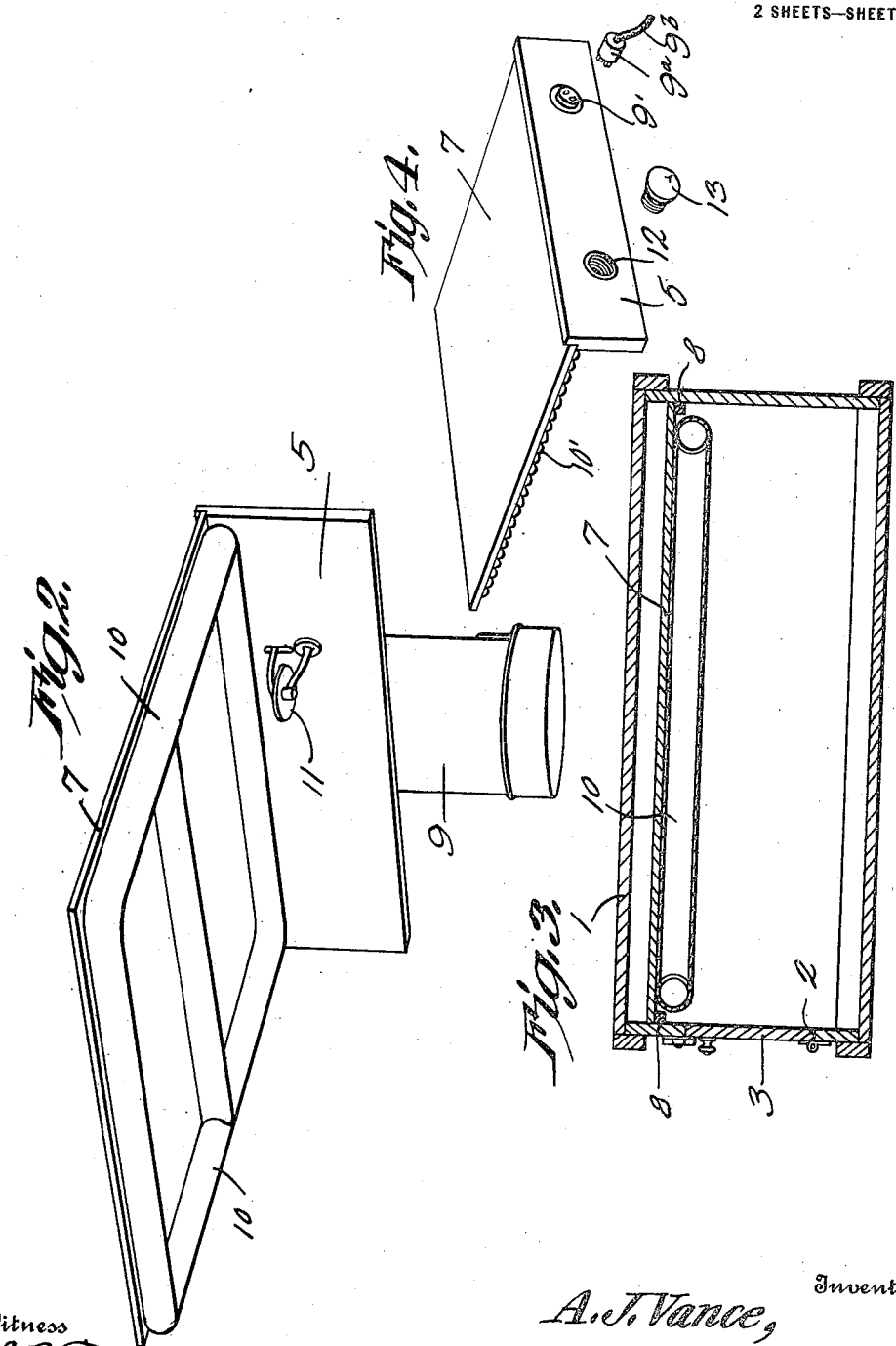

UNITED STATES PATENT OFFICE.

ALVA JAMES VANCE, OF MEDFORD, OREGON.

REMOVABLE HEATING PLANT FOR INCUBATORS, &c.

1,245,829.  Specification of Letters Patent.  Patented Nov. 6, 1917.

Application filed April 2, 1917. Serial No. 159,277.

*To all whom it may concern:*

Be it known that I, ALVA J. VANCE, a citizen of the United States, residing at Medford, in the county of Jackson and State of Oregon, have invented a new and useful Removable Heating Plant for Incubators, &c., of which the following is a specification.

The present invention relates to a heating plant or unit for use in connection with incubators, brooders, and the like, and aims to provide a novel and improved heating plant which can be applied removably and interchangeably to incubators, brooders and kindred structures, in order that one heating plant or unit can be used in an incubator, and after the hatching transferred to a brooder for keeping the chicks warm. The removability of the heating plant or unit is also of advantage for making repairs, examinations, and the like.

It is also the object of the invention to provide a device of the nature indicated which is comparatively simple, compact and inexpensive in construction, as well as being thoroughly practical, serviceable and efficient in use.

With the foregoing and other objects in view which will appear as the description proceeds, the invention resides in the combination and arrangement of parts and in the details of construction, hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a perspective view of an incubator showing the improved heating plant applied thereto.

Fig. 2 is a perspective view of the heating plant removed.

Fig. 3 is a section on the line 3—3 of Fig. 1.

Fig. 4 is a perspective view of an electrical heating unit, portions being detached therefrom.

In the drawings, there is depicted a conventional type of incubator including the casing 1, but it is to be understood that the present device can be applied to various incubators and brooders in appropriate manners, according to the circumstances. The casing 1, in the structure as illustrated, is provided in addition to the usual door opening 2 at one side normally closed by a hinge door 3, with an opening 4, at another side of the casing, as illustrated, but this is not compulsory, since the opening 4 can be located at any suitable point of the casing. The opening 4 is normally closed by a removable cover 5, forming a part of the present unit, and said cover 5 is removably held within the opening 4 to close the same by means of ordinary catches 6 carried by the casing 1. A slide or plate 7, arranged horizontally as illustrated, is mounted slidably within the casing 1 underneath the top thereof, and can be supported by cleats 8 secured to opposite side walls of the casing, as seen in Fig. 3. The cover 5 is secured to and depends from the outer edge of the slide 7. Thus, when the slide 7 is inserted and moved into place, the cover 5 will be brought within the opening 4 to close the same, said slide being readily applied to and removed from the casing 1.

As illustrated in Figs. 1, 2 and 3, the heating plant or unit proper is of the hot water type, and embodies a boiler and a heater 9 attached to and suspended from the outer side of the cover 5, and a water circulating pipe or conduit 10 disposed below and suspended from the slide 7. A thermostat or controlling device 11 is carried by the cover 5 at the inner side thereof and is connected to the boiler and heater to control the same in the ordinary manner, the connection being made through the cover, as illustrated. Thus, when the slide is slid into place within the casing, this will bring the circulating conduit 10 within the casing above the incubating chamber to radiate the heat downward, the thermostat also being brought within the casing to regulate the temperature. It will be noted that the complete heating plant and controlling device are carried by the slide and cover 5, thereby providing a unit which can be readily applied and removed, and which when removed from the incubator, can be applied to a brooder in the same manner for keeping the chicks warm after hatching. The heating plant can also be readily removed for purpose of cleaning, examination or repairs.

A hot air heating system can also be used, in which event the pipe or conduit 10 supplies heated air instead of holding hot water as will be apparent.

Fig. 4 illustrates an electrical heating plant or unit, embodying the resistance coil 10' disposed underneath and suspended from the slide 7. The cover 5 has a socket or connection 9' for the coil 10' and for the engagement of a connecting plug 9ª of the electrical conductors or cord 9ᵇ. The cover 5 also carries a socket 12 for a signal lamp 13.

In each form of the invention, the heat radiator is carried by the slide 7, and the heat or energy supplying means and controlling means are carried by the cover 5.

Having thus described the invention, what is claimed as new is:—

1. A device of the character described embodying a slide movable into a casing, a cover carried by the slide for closing and opening of the casing, a heat radiating means carried by the slide, and controlling means for said means carried by the cover.

2. The combination with a casing having an opening, of a slide movable into the casing through said opening, a cover for the opening carried by the slide, a heat radiating means carried by said slide, and controlling means for said means carried by the cover.

In testimony that I claim the foregoing as my own, I have hereto affixed my signature in the presence of two witnesses.

ALVA JAMES VANCE.

Witnesses:
P. B. HAMMOND,
JNO. H. ROLSTON.

Copies of this patent may be obtained for five cents each, by addressing the "Commissioner of Patents, Washington, D. C."